US005636246A

United States Patent [19]
Tzannes et al.

[11] Patent Number: 5,636,246
[45] Date of Patent: Jun. 3, 1997

[54] MULTICARRIER TRANSMISSION SYSTEM

[75] Inventors: Michael A. Tzannes, Newton; Stuart D. Sandberg, Arlington, both of Mass.

[73] Assignee: Aware, Inc., Bedford, Mass.

[21] Appl. No.: 340,747

[22] Filed: Nov. 16, 1994

[51] Int. Cl.$^6$ .............................. H04K 1/10; H04L 27/28
[52] U.S. Cl. ........................... 375/260; 375/221; 370/480
[58] Field of Search ...................................... 375/260, 355, 375/347, 231, 222, 220, 221; 370/69.1

[56] References Cited

U.S. PATENT DOCUMENTS

| | | | |
|---|---|---|---|
| 4,679,227 | 7/1987 | Hughes-Hartogs | 379/98 |
| 4,731,816 | 3/1988 | Hughes-Hartogs | 379/98 |
| 5,048,054 | 9/1991 | Eyuboglu et al. | 375/8 |
| 5,206,886 | 4/1993 | Bingham | 375/97 |
| 5,285,474 | 2/1994 | Chow et al. | 375/13 |

OTHER PUBLICATIONS

John A.C. Bingham, "Multicarrier Modulation for Data Transmission: An Idea Whose Time Has Come," IEEE Comm. Mag., May 1990. pp. 5–14.

*Primary Examiner*—Stephen Chin
*Assistant Examiner*—Don Vo
*Attorney, Agent, or Firm*—Calvin B. Ward

[57] ABSTRACT

A communication system for sending a sequence of symbols on a communication link. The transmitter receives a sequence of symbols and groups the symbols into a block of symbols for which transmission is to be initiated in a following frame. Each symbol is used to modulate a different carrier. At the receiver, the signal from the communication link is decoded by a plurality of finite impulse response (FIR) filters that are matched to the waveforms modulated by the symbols in the transmitter. Errors arising from synchronization errors between the transmitter and receiver are corrected by forming weighted sums of the symbols decoded by the FIR filters for the current frame and frames received prior to and/or after the current frame. The weights are determined by training samples sent on the communication link prior to the actual transmissions. In systems in which the communication link introduces phase distortions into the signals sent thereon, the receiver includes a second bank of FIR filters that measures the amplitude of the signal in each of the carrier frequency bands after the signal has been phase shifted. The symbols generated by this second bank of filters are included in the weighted sum using weights that are also determined during the training session. The modulated carrier signals extend over a plurality of frames overlapping carrier signals from prior frames which provides improved noise immunity.

3 Claims, 4 Drawing Sheets

MULTICARRIER TRANSMISSION SYSTEM

FIELD OF THE INVENTION

The present invention relates to systems for multicarrier transmission of data, and more particularly, to an improved equalization method for use in such systems.

BACKGROUND OF THE INVENTION

In a multicarrier system, a communication path having a fixed bandwidth is divided into a number of sub-bands having different frequencies. The width of the sub-bands is chosen to be small enough to allow the distortion in each sub-band to be modeled by a single attenuation and phase shift for the band. If the noise level in each band is known, the volume of data sent in each band may be optimized by choosing a symbol set having the maximum number of symbols consistent with the available signal to noise ratio of the channel. By using each sub-band at its maximum capacity, the amount of data that can be transmitted in the communication path is maximized.

In practice, such systems are implemented by banks of digital filters which make use of fast Fourier transforms. Consider the case in which a single data stream is to be transmitted over the communication path which is broken into M sub-bands. During each communication cycle, the portion of the data stream to be transmitted is converted to M symbols chosen to match the capacity of the various channels. Each symbol is the amplitude of a corresponding sub-carrier. The time domain signal to be sent on the communication path is obtained by modulating each sub-carrier by its corresponding amplitude and then adding the modulated carriers to form the signal to be placed in the communication path. This operation is normally carried out by transforming the vector of M symbols via the inverse Fourier transform to generate M time domain values that are sent in sequence on the communication path. At the other end of the communication path, the M time domain values are accumulated and transformed via a Fourier transform to recover the original M symbols after equalization of the transformed data to correct for the attenuation and phase shifts that occurred in the channels.

This idealized system encounters two types of problems in practice. First, in many environments, the noise encountered is restricted to a few narrow frequency sub-bands; however, the noise has an amplitude that is of the same order, or even greater, than the signals sent in the sub-band. This type of noise results from the pickup of other narrow band communication signals that impinge on the communication path. These signals enter the system at points in the communication that are not sufficiently shielded. In long communication paths, providing perfect shielding is not practical.

In principle, a multicarrier transmission system can detect the presence of a high noise signal in one sub-band and merely avoids transmitting data in that sub-band. In practice, this solution does not function properly because of the characteristics of the sub-bands obtained using Fourier transforms. The Fourier transform provides sub-bands that are isolated by only 13 dB. Hence, the sub-bands have sidelobes that extend into the neighboring channels. A large noise signal in one channel will spill over into several channels on each side of the channel in question. Hence, a substantial fraction of the communication path capacity may need to be taken off line to avoid a high intensity, narrow band noise signal.

The second type of problem is encountered in multi-point transmission systems. Consider the case in which a number of subscribers are located along a communication path which couples each subscriber to a central office. In the simplest case, each subscriber is assigned a first sub-band to send messages to the central office and a second sub-band to receive messages from the central office. The multicarrier system described above assumes that all of the subscribers and the central office are synchronized with one another. If a subscriber is out of synchronization with the central office, intersymbol interference can occur. That is, the symbol decoded by the subscriber will include interference from other symbols in other sub-bands and/or earlier or later symbols transmitted in the subscriber's sub-band. This type of interference is further aggravated by the high sidelobes in the sub-bands provided by the Fourier transform.

Prior art systems solve the intersymbol interference problems by including additional data in each sub-band that can be used to correct the timing errors. This additional data reduces the amount of information that can be transmitted on each sub-band, since the data must be sent in the sub-band, and hence, uses some of the bandwidth of the sub-band.

Broadly, it is the object of the present invention to provide an improved multi-carrier transmission system.

It is a further object of the present invention to provide a multi-carrier transmission system that is better adapted to the elimination of narrow band noise signals than prior art systems.

It is a still further object of the present invention to provide a multi-carrier transmission system in which intersymbol interference resulting from timing errors may be eliminated without reducing the bandwidth of the communication channels.

These and other objects of the present invention will become apparent to those skilled in the art from the following detailed description of the invention and the accompanying drawings.

SUMMARY OF THE INVENTION

The present invention is a communication system for sending a sequence of symbols on a communication link. The communication system includes a transmitter and receiver. Transmissions on the communication link are synchronized into time periods referred to as frames. In one embodiment of the present invention, the transmitter receives a sequence of symbols and groups the symbols into a block of symbols to be sent in the next frame. Each symbol is used to modulate a different carrier. The modulated carrier signals are summed to form a waveform that is placed on the communication link. At the receiver, the signal from the communication link is decoded by a plurality of finite impulse response (FIR) filters that are matched to the waveforms modulated by the symbols in the transmitter. Errors arising from synchronization errors between the transmitter and receiver are corrected by forming weighted sums of the symbols decoded by the FIR filters for the current frame and frames received prior to and/or after the current frame. The weights are determined by training samples sent on the communication link prior to the actual transmissions. In systems in which the communication link introduces phase distortions into the signals sent thereon, the receiver includes a second bank of FIR filters that measure the amplitude of the signal in each of the carrier frequency bands after the signal has been phase shifted. The symbols generated by this second bank of filters are included in the weighted sum using weights that are also determined during the training session. In one embodiment of the present invention, the receiver also includes means for detecting errors in the symbols transmitted on a particular carrier resulting from narrow band interference on the communication link. The identity of the corresponding frequency band is sent to the transmitter which eliminates the band in question from the bands on which symbols are sent. In the preferred embodiment of the present invention, the modulated carrier signals generated for any given frame of symbols extend over a plurality of frames overlapping carrier signals from other frames.

DETAILED DESCRIPTION OF THE INVENTION

Figure 1:
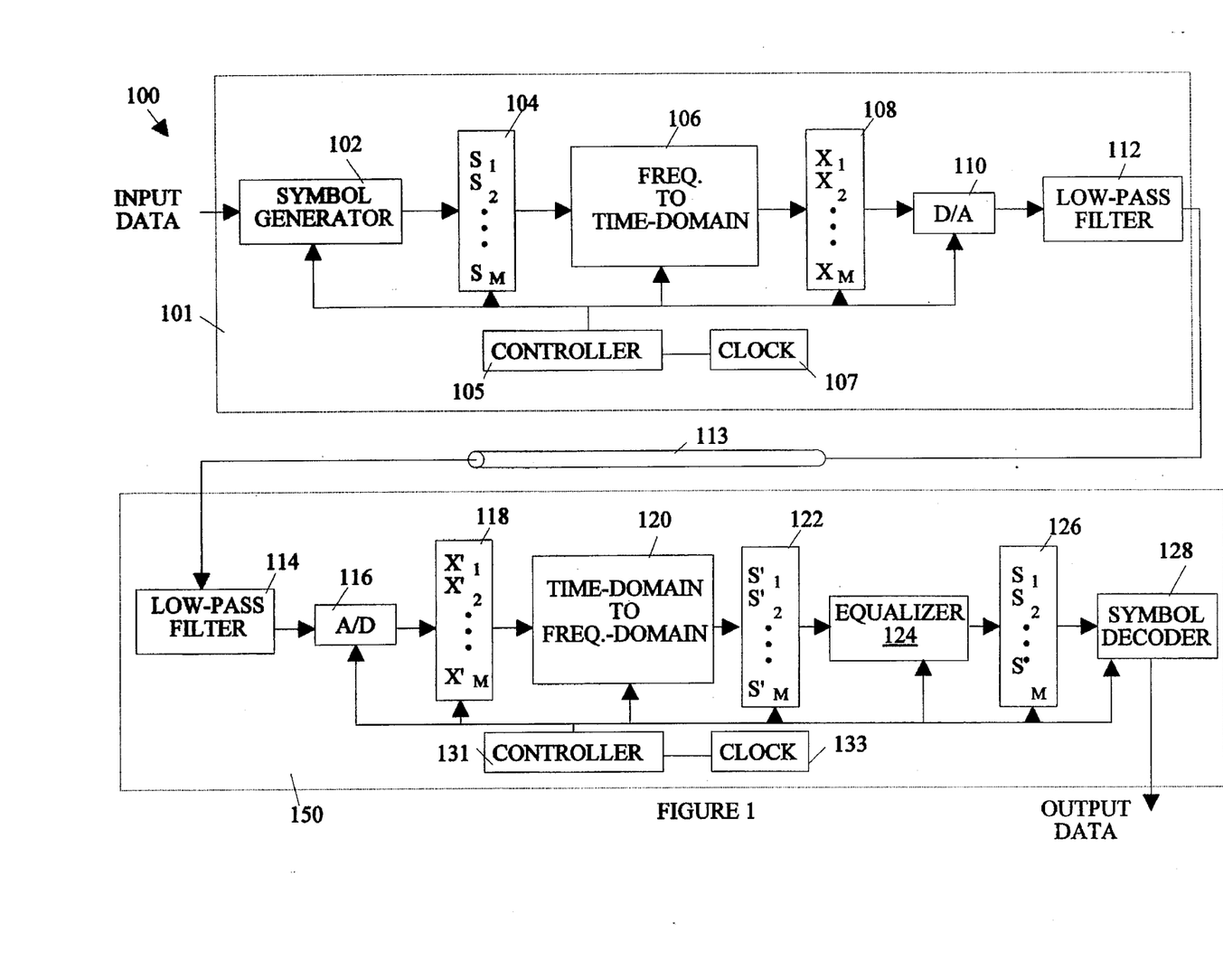
FIG. 1 is a block diagram of a multicarrier transceiver 100 according to the present invention.

The manner in which the present invention operates can be more easily understood with reference to FIG. 1 which is a block diagram of a multicarrier transceiver 100 according to the present invention. Transceiver 100 transmits data on a communication link 113. The input data stream is received by a symbol generator 102 which converts a run of data bits into M symbols $S_1, S_2, \ldots, S_M$ which are stored in a register 104. The number of possible states for each symbol will depend on the noise levels in the corresponding frequency band on the transmission channel 113. For the purposes of the present discussion, it is sufficient to note that each symbol is a number whose absolute value may vary from 0 to some predetermined upper bound and that the run of data bits is much greater than M.

Transceiver 100 treats the symbols $S_i$ as if they were the amplitude of a signal in a narrow frequency band. Frequency to time-domain transform circuit 106 generates a time domain signal $X_i$, for i from 0 to M−1, that has the frequency components $S_i$. The time domain signals are stored in a shift register 108. The contents of shift register 108 represent, in digital form, the next segment of the signal that is to be actually transmitted over communication link 113. The actual transmission is accomplished by clocking the digital values onto transmission link 113 (possibly after upconversion to radio frequencies) after converting the values to analog voltages using D/A converter 110. Clock 107 provides the timing pulses for the operation. The output of D/A converter 110 is low-pass filtered by filter 112 before being placed on communication link 113.

At the receiving end of transmission link 113, the transmission segment is recovered. The signals received on communication link 113 are low-pass filtered to reduce the effects of high-frequency noise transients. The signals are then digitized and shifted into a register 118. When M values have been shifted into register 118, the contents thereof are converted via a time-domain to frequency-domain transform circuit 120 to generate a set of frequency domain symbols S'i. This transformation is the inverse of the transformation generated by frequency to time-domain transform 106. It should be noted that communication link 113 will, in general, both attenuate and phase shift the signal represented by the $X_i$. Hence, the signal values received at low-pass filter 114 and A/D converter 116 will differ from the original signal values. Thus, the contents of shift register 118 will not match the corresponding values from shift register 108. For this reason, the contents of shift register 118 are denoted by $X'_i$. Similarly, the output of the time to frequency-domain transform will also differ from the original symbols $S_i$; hence, the contents of register 122 are denoted by $S'_i$. Equalizer 124 corrects the $S'_i$ for the attenuation and phase shift resulting from transmission over communication link 113 to recover the original symbols which are stored in buffer 126. In addition, equalizer 124 corrects the symbols for intersymbol interference arising from synchronization errors between the transmitter and receiver. The manner in which this is accomplished will be explained in more detail below. Finally, the contents of buffer 126 are decoded to regenerate the original data stream by symbol decoder 128.

In prior art systems, the time-domain to frequency domain transformations were implemented using FFT and IFFT transforms. In the present invention, the Fourier transform modulation scheme is replaced by an overlapped transform implemented filter bank that results in sub-channels that have significantly reduced sidelobes relative to those obtained in the Fourier implementation. The lower sidelobe levels reduce interference between channels. As a result, the present invention achieves lower bit-error rates than Fourier transform based systems. In addition, the present invention achieves improved immunity to impulse noise and improved performance in environments having narrow band noise.

The manner in which an overlapped transform operates may be more easily understood by first reviewing the manner in which the FFT and IFFT transform based systems operate. As noted with reference to FIG. 1, the data to be transmitted is grouped into blocks, each block containing M symbols. The number of possible states for each symbol depends on the signal-to-noise ratio in a corresponding frequency band on the communication link. Time is divided into contiguous, non-overlapping equal length intervals, referred to as frames. Each frame is divided into M sub-intervals. In each time frame, one block of M symbols is transmitted. The transmission signal sent on communication link 113 shown in FIG. 1 may be viewed as consisting of the sum of M sub-carriers with each sub-carrier being amplitude modulated by a corresponding symbol over the time period of one frame. The amplitude of the modulation signal is constant over the frame. The segment of the transmission signal corresponding to one frame is a pulse having a length equal to one frame time. The pulse for frame k is completed before the pulse for frame k+1 is sent. The shape of the pulse is a sequence of M values, one per sub-interval, obtained by applying the inverse discrete Fourier transform to the vector of M symbol values to obtain the M time-domain values. At the receiver, the M time-domain samples are input to a discrete Fourier transform to recover the M symbol values.

While the preferred embodiments of a Fourier transform system are preferably implemented using fast algorithms, for the purpose of simplifying the present discussion, it will be assumed that the transforms are applied without the aid of FFT's. In this case, the frequency to time-domain transformation may be viewed as an M×M matrix in which the $i^{th}$ row of the matrix corresponds to the contribution to the final signal pulse that would result if the symbol value sent on the $i^{th}$ sub-carrier were a one. In practice, each row is multiplied by the corresponding symbol value to obtain a new matrix whose columns are added together to form the M time-domain samples which makeup the pulse corresponding to the frame. The original symbols, in the absence of distortions by the communication channel, are recovered by multiplying the vector of M time-domain samples by a discrete Fourier transform matrix to obtain the vector of M symbols.

An overlapped transform according to the present invention may be viewed as a pair of transforms in which the frequency to time-domain transformation is performed with a non-square matrix having M rows that are gM elements in length. While the preferred embodiment of an overlapped transform based system are preferably implemented using fast algorithms (such as FFTs and fast DCTs); it will be assumed, for the purposes of simplifying the present discussion, that the transforms are performed without the aide of such algorithms, as the computational rearrangements inherent in these algorithms obscure the underlying computations. The value of g is referred to as the genus of the transformation. Here, g is a positive integer. Time is still divided in frames that are M sub-intervals long. Let $S_i^p$ denote the set of M symbols for which transmission is initiated at the beginning of frame p. The pulse used to transmit $S_i^p$ spans frames p, p+1, . . . , p+g−1 and overlaps with the pulses used to transmit $S_i^k$ for p−g+1≤k≤p+g−1. The segment of the waveform transmitted in frame p contains contributions from the pulses used to transmit $S_i^k$ for p−g+1≤k≤p.

By spreading the transmission pulses in time, the equivalent filter bands used to recover the symbols are much sharper in the frequency domain. That is, the filter bands have much lower sidelobes. This is accomplished at no decrease in the rate at which information is sent because the pulses in adjacent frames are allowed to overlap. As will be explained in more detail below, the overlapped transform is designed to provide lossless reconstruction of the symbols at the receiver. Since the pulses are spread over much longer time intervals, a transceiver according to the present invention provides improved immunity to burst noise compared to systems in which g=1.

Figure 2:
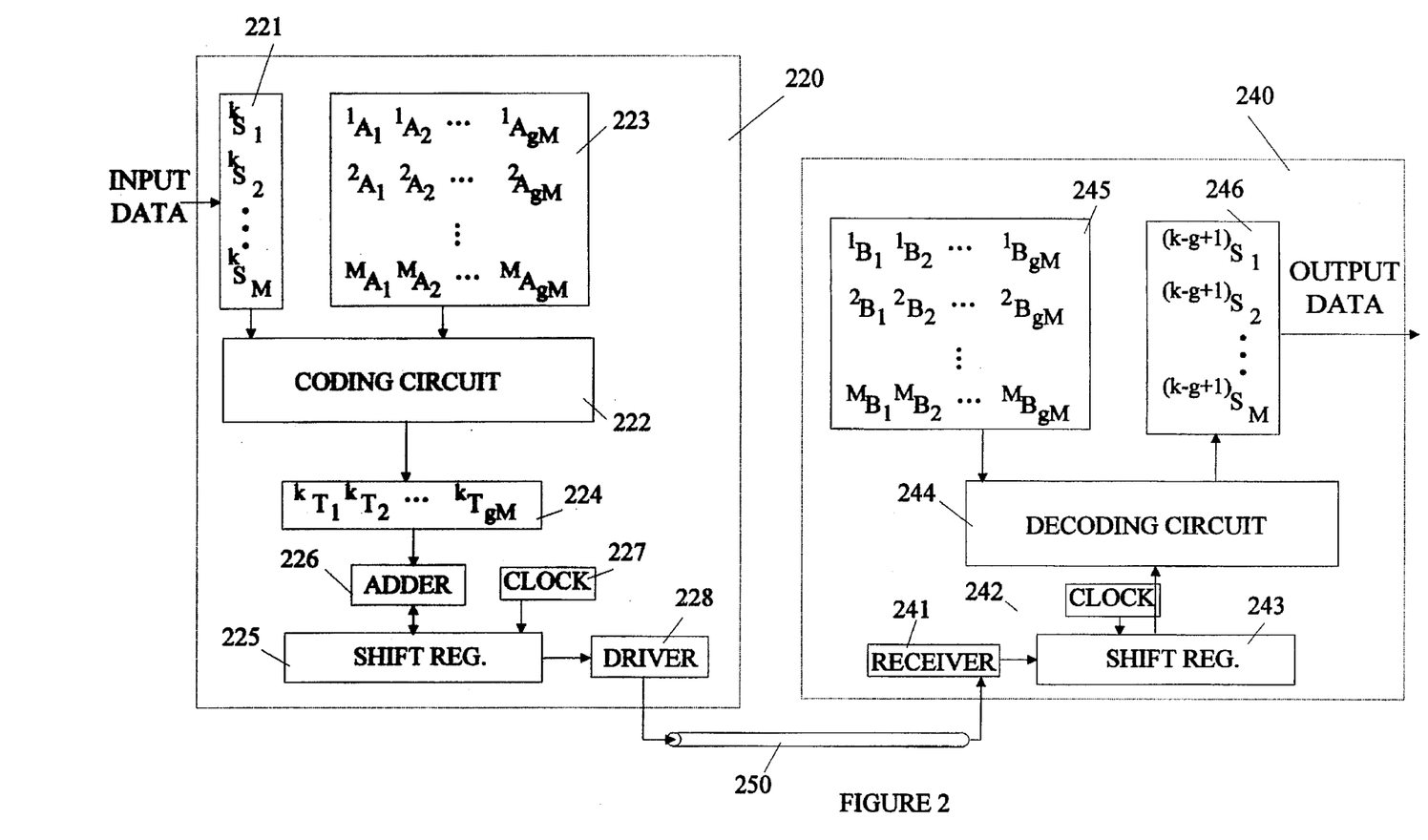
FIG. 2 is a more detailed diagram of a transmission system using a coding scheme according to the present invention.

Refer now to FIG. 2 which is a more detailed diagram of a transmission system using a coding scheme according to the present invention. The symbols for transmission are received in a register 221. For the purposes of this discussion, a clock cycle will be defined to have length equal to the time duration between samples. Once every M clock cycles, the M symbols for which transmission is to be initiated in the next frame are processed by coding circuit 222 to generate the gM time-domain samples representing the M symbols. The time domain samples representing $^kS_i$ are denoted by $^kT_l$ for l=1 to gM. The time domain samples are computed from the symbols and a coding matrix 223 having coefficients $^jA_p$ for j=1 to M and p=1 to gM. In general, $$^kT_i = \sum_{j=1}^{M} {}^kS_j *{}^jA_i \qquad (1)$$

for i=1 to gM. The gM time domain samples are added to the contents of a gM entry shift register 225. The contents of shift register 225 are shifted to the right one sample each clock cycle. Hence, the M left-most entries of the shift register will contain 0 and the remaining entries will contain sums of various time domain samples generated in previous frames. The samples that are shifted out of shift register 225 are sent on communication link 250 with the aid of driver 228. The signals on communication link 250 are, in general, analog in nature. It should be noted that driver 228 may include circuitry for modulating an RF signal (double or single sideband) or a laser depending on the mode of transmission on communication link 250.

At the receiving end of communication link 250, a receiver 241 converts the received signal to baseband if the transmitter modulated a carrier as part of the transmission scheme and digitizes the resulting signal. Once each clock cycle the output of receiver 241 is sampled and shifted into a gM entry shift register 243. The oldest entry in shift register 243 is lost in this operation. For the purposes of the present discussion, clock 242 in receiver 240 is assumed to be synchronized with clock 227 in transmitter 220.

The decoding operation decodes one block of M symbols each M clock cycles. Once each M clock cycles, M weighted sums of the contents of shift register 243 are computed. The weights for each sum are the rows of a decoding matrix 245. The sums are generated by decoding circuit 244. Each sum corresponds to one of the M symbols for which transmission commenced (g−1) frames earlier. The $i^{th}$ recovered symbol is related to the contents of shift register 243 by the following relationship $$^{(k-g+1)}S_i' = \sum_{j=1}^{gM} C_j *{}^iB_j \qquad (2)$$

Here, $C_j$ for j=1 to gM are the entries in shift register 243 and the $^iB_j$ are the entries of the decoding matrix. The recovered symbols are denoted by S' to emphasize that these symbols may be corrupted due to timing errors and distortions introduced on the communication link. The symbols recovered at the receiver when the transmitter has finished sending the time domain data for the $k^{th}$ frame are those for which transmission was commenced in frame (k−g+1), since the transmission waveform has a duration of g frames.

For Eq. (2) to recover the original symbol set, the coefficients in the decoding matrix must be related to those in the coding matrix by the following relationship:

$$\sum_{j=1}^{gM} {}^iB_j *{}^pA_j - sM = \delta_{i,p}\delta_{s,0} \qquad (2a)$$

where $\delta_{x,y}=0$ to if x≠y, and 1 if x=y. Here, $^iB_j$ and $^pA_j$ are defined to be 0 for j<1 or j>gM. Consider the case in which i=p. Eq. (2a) requires that the inner product of each row in the decoding matrix and the corresponding row in the encoding matrix is equal to one. This assures that the symbols will be recovered with unit gain in a perfect transmission system. Eq. (2a) also requires that the inner product of each row in the decoding matrix with the corresponding row in the coding matrix shifted by lM (for l is a non-zero integer) is zero. This condition assures that the decoding operation will not suffer interference from a symbol whose transmission was commenced on the same sub-channel in a different frame. In the cases in which i≠p, Eq (2a) requires the inner products of all rows in A and all rows in B shifted by any integer multiple of M are also zero. This condition assures that symbols transmitted on other sub-channels will not interfere with the decoding of the symbols transmitted on the $i^{th}$ channel.

A number of different coding matrices satisfy Eq (2a). The characteristics of the resulting transmissions in terms of the frequency spectrum occupied by the signal corresponding to each symbol vary with the choice of coding matrix. In the preferred embodiment of the present invention, the coding matrix is chosen such that the transmission corresponding to any given signal is confined to a narrow frequency band. That is, the M symbols commenced in any given frame are sent in M narrow frequency bands. In the ideal case, these frequency bands do not overlap. In practical implementations, however, the sidelobes of frequency band overlap into adjacent frequency bands. In the preferred embodiment of the present invention, for any k, the frequency response of filter k should be very low (e.g. <30 dB) where it intersects the main lobe of the frequency response of filter k+2.

The methods by which the coefficient vectors for the overlapped filters are generated are known to those skilled in the art. In particular, the reader is referred to "Signal Processing With Lapped transforms," H. Malrar, Artech Howe, 1992. This publication provides examples of g=2 and g=4 transforms. It also describes fast algorithms for their implementation.

The embodiment described with reference to FIG. 2 assumes that the receiver and transmitter clocks are perfectly synchronized and that the distortions introduced by communication link 250 are minimal. In this case, only noise on communication link 250 will interfere with the transmission of data in the system. Error coding schemes for dealing with white noise are well known to the prior art, and hence will not be discussed in more detail here. While white noise is always present to some degree, in many situations, the most prevalent source of errors is narrow band interference which affects a small fraction of the frequency bandwidth of the communication channel.

In principle, narrow band interference can be removed by not using the portion of the communication spectrum occupied by the noise. As noted above, the present invention may be viewed as a scheme in which M narrow band channels are used to transmit the M symbols in each frame, each frame being sent in one such channel. If narrow band interference makes a particular band unusable, in principle, the transmitter need only avoid sending a symbol in that band. In this case, the remaining M−1 bands may still transmit data, and hence, the noise is avoided while retaining almost all of the communication bandwidth.

In prior art systems utilizing Fourier transforms, this strategy is not practical because the equivalent filter bandwidths of such systems are too broad. The inverse transformation that recovers the symbols from the communication link is equivalent to a set of M bandpass filters. If the filters were ideal bandpass filters, then an unwanted signal in one band would not be picked up in the adjacent bands, and the above-described strategy for avoiding narrow band interference would be adequate. Unfortunately, the equivalent filters for the Fourier transform have very high sidelobes. As a result, a large signal introduced into one band is captured by the high sidelobes of a large number of adjacent bands making these bands unusable as well.

The equivalent filter sidelobes for the transformations used in the present invention are much lower than those obtained with Fourier transforms, and hence, a large noise signal in one band has less of an effect on the adjacent channels. As noted above, this is a direct consequence of spreading the transmission in time. The longer the transmission in the time domain, the sharper the frequency band in the frequency domain. Hence, by using transforms having genus greater than one, significant improvements in narrow band interference rejection are achieved.

Figure 3:
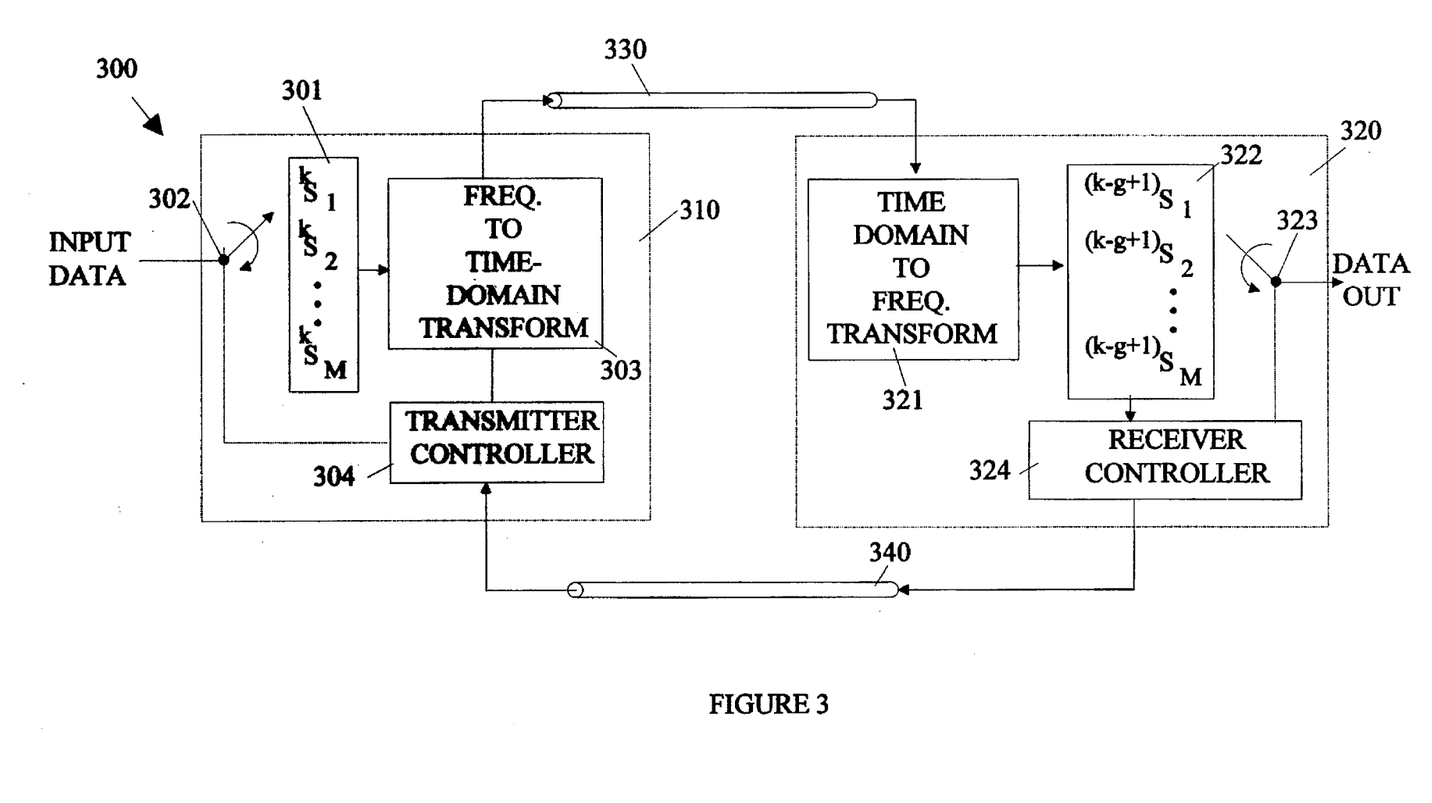
FIG. 3 is a block diagram of a transmission system 300 according to the present invention.

The manner in which narrow band noise is accommodated in a transmission system according to the present invention will now be discussed in more detail with reference to FIG. 3 which is a block diagram of a transmission system 300 according to the present invention. In transmission system 300, data is received by transmitter 310 for transmission to receiver 320 on communication link 330. The incoming data is divided into symbols by a transmission controller utilizing a commutator switch 302. The symbols are stored in register 301. Frequency to time-domain transform generator 303 generates the time-domain samples that are transmitted on communication link 330. To simplify the drawing, the various shift registers and drivers discussed above have been omitted.

At receiver 320, the symbols are recovered with the aid of time to frequency domain transform 321 which stores the recovered symbols in register 322. The recovered symbols are converted to the output data stream with the aid of commutator switch 323 which is under the control of receiver controller 324. Receiver controller 324 also monitors the recovered symbols for errors resulting from narrow band noise. If such noise is present, one of the symbols will be corrupted for several frames. This corruption may be detected by including error correction and detection bits in the original symbol, or by detecting an unusually large amplitude at a subchannel output. When receiver controller 324 detects narrow band interference, it signals transmitter controller 304 on upstream communication link 340. Transmitter controller 304 then prevents data from being placed in the corrupted channel by causing commutator switch 301 to skip the channel. At the receiving end, receiver controller 324 also causes its commutator switch to skip the corrupted channel. Hence, the transmission system appears to operate normally, but with a slightly reduced throughput.

It should be noted that the upstream communication requires very little bandwidth, since it is used for sending small amounts of control information. In two-way communication systems, upstream communication link 340 may be one channel in the upstream communication link used to send data in the upstream direction. While two separate communication links have been shown, it is to be understood that both communication links could be implemented on the same physical communication medium.

The above discussion assumes that the transmitter and receiver are well synchronized and that the distortions introduced by the communication link are minimal. In many applications, one or both of these assumptions are not met. As will be explained in more detail below, this situation often arises in distributed communication systems such as those utilized in telecommunications. However, to simplify the following discussion, the problem and its solution will first be discussed with reference to a simple two point communication system such as that described with reference to FIG. 3 above.

If the transmitter and receiver are not adequately synchronized, the receiver will view the data from one frame in another frame's time slots. This shift in data can effect the results from several frames in high genus systems. This shift also results in inter-symbol interference, since Eq. (2a) is not satisfied with respect to the shifted time frames. As a result, the symbols recovered by performing the inner products of the contents of the shift register with the rows of the decoding matrix will be in error and must be corrected. The correction scheme will be referred to as equalization in the following discussion.

Denote the results of convolving the $i^{th}$ row of the decoding matrix with the contents of shift register 243 when the last time samples for the $k^{th}$ frame are received according to clock 242 by $^kS'_i$, where $$^kS'_i = \sum_{j=1}^{gM} {}^kC_j *^iB_j \qquad (3)$$

Here, $^kC_j$ for j=1 to gM are the entries in shift register 243 when clock 242 indicates that the last time sample corresponding to the $k^{th}$ frame has been received by shift register 243 and the $^iB_j$ are the entries of the decoding matrix.

Consider the case in which the receiver clock is ahead of where it should be. That is, the receiver begins to clock data for the $k^{th}$ frame into shift register 243 before the first entry for frame k arrives. In this case, some of the data for frame k will not be in the shift register when the receiver controller initiates the convolution of the shift register contents and decoding matrix. This information will, however, be in the shift register when the symbols for frame k+1 are calculated. Hence, information helpful in computing $^kS_i$ is contained in $^kS'_i$ and $^{k+1}S'_i$, and will also be present in other $^lS'_i$.

In principle, there are two potential solutions to this problem. The first solution would be to include a variable time delay in the receiver which is set by sending a known training set to the receiver prior to sending real data. This delay would need to be adjustable to within a fraction of a clock cycle. At high data rates, such a variable delay circuit would significantly increase the cost of the receiver hardware, and hence, is not the preferred embodiment.

The second solution which is used in the preferred embodiment of the present invention is to use an equalization strategy which recovers $^pS'_j$ from a weighted sum of the various $^kS'_I$ with k in the neighborhood of p and I in the neighborhood of j. This implementation is preferred because it can be implemented in the same signal processing hardware used in the "ideal" case by including some additional software to perform the additional computations. In general, an equalization operation involves a weighted sum of the form $$^kS_i = \sum_{j=i, i\pm 1, \ldots p} \sum a^p_{p,j} S'_j \qquad (4)$$

Here, p must range over the receiver frames having data from the $i^{th}$ symbol. The range of j values will depend on the sidelobes of the equivalent filters in the decoding operation. For filter bands in which the $j^{th}$ band has little spectral overlap with the $i^{th}$ band, the terms involving j≠i will be negligible. As noted above, one of the advantages of the present invention over prior art systems is the use of high genus filters which, in turn, provide equivalent filters which spectrally overlap fewer adjacent bands than those obtained using Fourier transforms.

The weighting coefficients, $a_{p,j}$, are determined by sending a training sample to the receiver comprising a sequence of known symbols in each channel. The coefficients are then computed using conventional least squares techniques to yield the smallest mean-squared difference between the symbols in the training sample and those recovered according to Eq. (4).

In the preferred embodiment of the present invention, the training operation is performed at the beginning of the transmission. However, it will be apparent to those skilled in the art that the training may be performed less frequently if the delays between the transmitter and receiver do not vary between transmissions.

For many communication links, the equalization method described with reference to Eq. (4) above would correct for the channel distortions as well as the clock synchronization errors. Incorporation of a second decoding matrix allows for more efficient (i.e., fewer equalizer taps are required to obtain a fixed bit-error-rate) equalization than that obtained with the single decoding matrix (e.g. 4). Correction for channel distortions and/or synchronization errors is preferably provided using two different decoding matrices and combining the results of the two decoding operations.

As noted above, the receiver implements a plurality of finite impulse response filters having pass bands corresponding to the various sub-bands. The output of each band filter measures the amplitude of the signal received on the communication link in the corresponding sub-band. Consider the case in which the communication link or timing errors introduces a phase shift of 90 degrees into one of the frequency components. The time-domain to frequency-domain transform filter bank only measures the real part of each frequency component underlying the time-domain sample sequence. Since a real frequency component that undergoes a 90 degree phase shift has no real part, the corresponding transform output has no contribution from this component. It should be clear from this simple example that the decoding scheme would benefit from the ability to measure both the amplitude and phase of the underlying frequency components. It should be noted that even in the cases in which the real part of the phase shifted frequency component is not zero, a measurement based on both the real and imaginary parts of the amplitude will be more immune to noise than one based solely on the real or imaginary parts. The decoding filter bank described above does not provide the capability of measuring both the real and imaginary parts of the frequency components.

To measure the phases in each subchannel a second filter bank that measures the amplitude of the time-domain signal in each subchannel at a phase shift different from 0 or 180 degrees is needed. In the preferred embodiment of the present invention, the second filter bank is chosen to measure the amplitude of the time domain signal at a phase shift of 90 degrees relative to the measurement made by the filter bank based on decoding matrix B described above. The second output of the filter bank is constructed by convolving the time domain samples from the shift register in the receiver with the rows of a second matrix that will be denoted by $\hat{B}$. One possible implementation of the matrix $\hat{B}$ is the matrix B time-reversed. That is, $^k\hat{B}_i = {^k}B_{gM-i}$, for i=0, ..., gM-1.

Denote the symbols computed using $\hat{B}$ on the shift register contents normally used to compute $^kS'_j$ by $^kH'_j$. That is, $$^kH'_i = \sum_{j=1}^{gM} {^kC_j} * \hat{B}_j \qquad (5)$$

Here, $^kC_j$ for j=1 to gM are the entries in shift register 243 when clock 242 indicates that the last time sample corresponding to the $k^{th}$ frame has been received by shift register 243 and the $^i\hat{B}_j$ are the entries of the second decoding matrix. The data from this second decoding computation may then be combined with $^kS'_j$ in a weighted sum to generate the corrected symbols in a manner analogous to that described above with reference to Eq. (4). That is, $$^kS_i = \sum_{j=i, i\pm 1, \ldots p} \sum [a^p_{p,j} S'_j + b^p_{p,j} H'_j] \qquad (6)$$

where the weighting coefficients $b_{p,j}$ are also computed during the training sample using conventional least squares fitting techniques.

Figure 4:
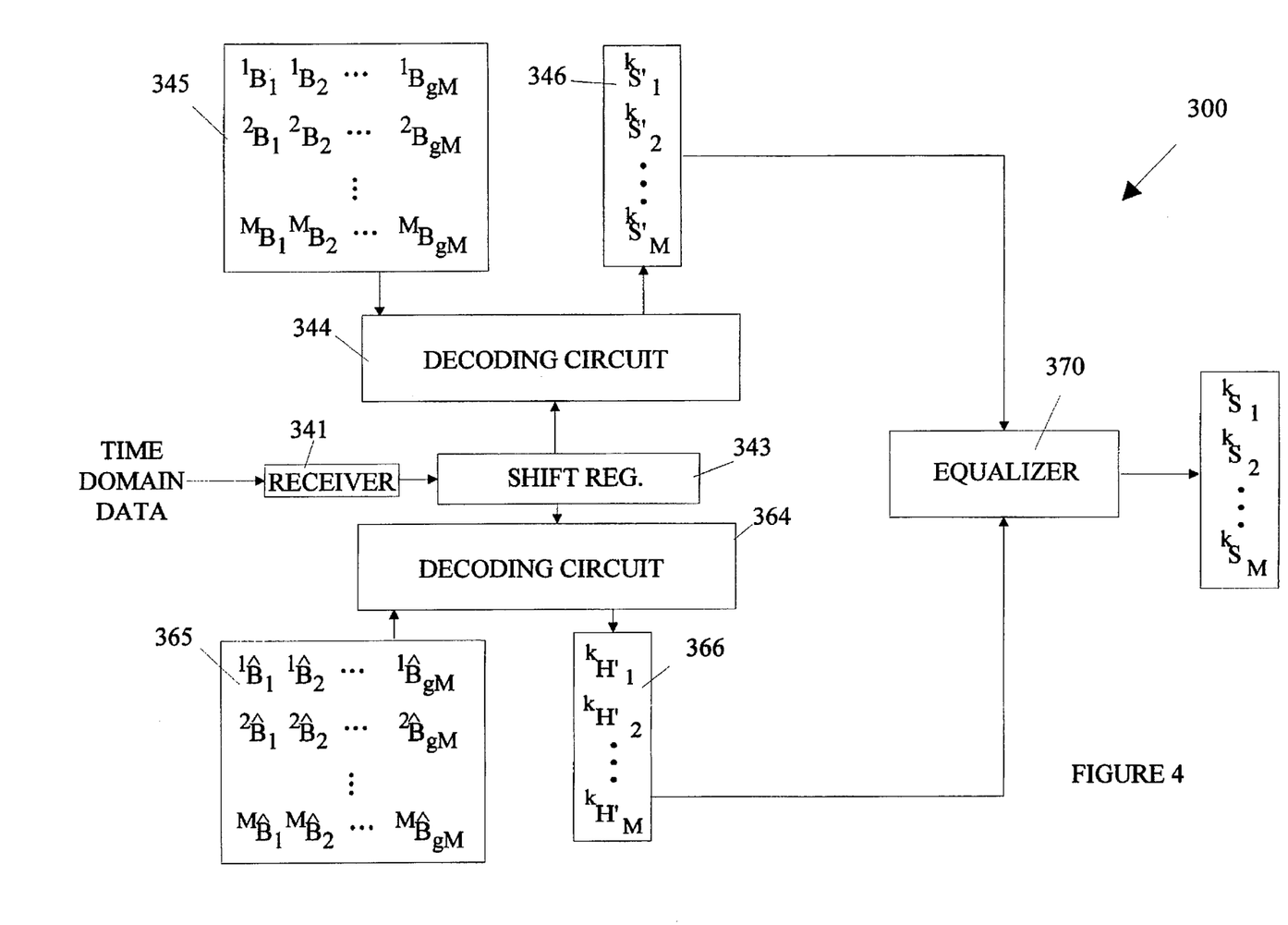
FIG. 4 is a block diagram of a receiver 300 that utilizes the equalization technique according to the present invention to recover symbols from a communication link.

Refer now to FIG. 4 which is a block diagram of a receiver 300 that utilizes the above-described equalization technique to recover symbols from a communication link. The data from the communication link is received by a time domain sample receiver 341 which clocks the data into a shift register 343 which holds the most recent gM time-domain samples. The clock and other logic circuitry necessary for carrying out this input operation has been included in receiver 341 to simplify the drawing.

When the last time domain sample for the $k^{th}$ frame has been received, decoding circuits 344 and 364 generate the symbol sets $^kS'_j$ and $^kH'_j$ for j=1 to M by evaluating the inner product of the contents of shift register 343 with each row of decoding matrices 345 and 365, respectively. The results are stored in registers 346 and 366, respectively. Equalizer 370 then generates the recovered symbols, $^kS_i$, according to Eq. (6).

While the embodiment of the present invention shown in FIG. 4 utilizes separate decoding circuits to generate the symbol sets $^kS'_j$ and $^kH'_j$, it will be apparent to those skilled in the art that the two symbols sets could be generated by the same decoding hardware using different decoding matrices. In this case, the second set of symbols would be computed after the first set of symbols. While such an embodiment would require longer to decode the symbols in each frame, it would require less hardware, and hence, cost less. In applications in which the data rates permit such serial decoding, this second embodiment of a receiver according to the present invention would be the preferred embodiment. Similarly, the equalization computations can also be carried out by the same signal processing hardware used in the decoding circuit further reducing hardware costs in those situations in which the data rates allow such serial computations.

While the above embodiments of the present invention have been described in terms of one transmitter and one receiver, it will be apparent to those skilled in the art from the above discussion that the present invention can be utilized in a multi-point communication system in which a plurality of satellite stations communicate with a central station. Such arrangements are common in telecommunication applications in which subscribers are coupled to a central office by a shared communication link.

To simplify the following discussion, it will be assumed that each subscriber communicates with the central office on a single sub-band. Each subscriber exchanges data with the central office. Either the subscriber or the central office can initiate a "call". The initiating party typically signals the receiving party on a common communication channel that is monitored by all subscribers and the central office. This channel will be referred to as the "control channel" in the following discussion. The central office is responsible for allocating the sub-bands to be used in the call. One sub-band is allocated for data from the subscriber to the central office and one for data from the central office to the subscriber. The central office uses the control channel to inform the subscriber of the sub-bands assigned for the call.

While the subscriber receives the signal representing all of the traffic on the communication link, the subscriber only decodes that traffic corresponding to the subscriber's assigned sub-band. That is, the subscriber convolves the contents of the shift register in his or her receiver with only the row of the decoding matrix corresponding to the subscriber's assigned channel and recovers only the symbols in that sub-band.

Similarly, when the subscriber sends a symbol to the central office on the sub-band assigned for communications from the subscriber to central office, the subscriber's transmitter modulates only one row of the coding matrix. The resultant signal is shifted onto the communication link via a driver that adds the signal to the signals already on the communication link.

The above description assumed that only one sub-channel was assigned in each direction between the central office and each subscriber in response to a request to send data between the two stations. However, the bandwidth requirements of a subscriber may be greater than the available bandwidth in a single sub-band. In this case, a plurality of channels may be assigned in one or both directions. Data is then allocated between groups of symbols as described above, and the transmitter modulates the corresponding sub-bands by multiplying the corresponding rows in the coding matrix and adding the resulting scaled rows to obtain the time domain signal that is to be added to the signal on the communication link.

As noted above, timing errors or channel distortions require equalization of the recovered symbols to generate the correct symbols. The equalization of a group of channels can be accomplished by training at the beginning of the communication session. Such training is adequate to correct for timing errors between a subscriber and the central office and assures that information in one of the assigned sub-bands does not interfere with information transmitted in the adjacent assigned sub-bands. However, if a second subscriber is sending information that is out of synchronization with the first subscriber, the out of synchronization information is analogous to noise introduced into the communication link. This information can spill over into the first subscriber's bands to the extent that the equivalent filters in the receivers have finite sidelobes. Hence, while equalization can satisfactorily reduce interference between signals in the various sub-bands assigned to a given subscriber, it cannot prevent interference from other sub-bands having poorly synchronized transmissions and which overlap spectrally with the band assigned to the given subscriber.

Furthermore, in a multi-subscriber system, sub-bands are continuously being re-assigned to different subscribers. Since each subscriber station has slightly different timing, this "noise" can change over the course of a communication session in a manner that is not predictable or correctable using pre-session training. Hence, some additional form of protection is needed in multi-user communication systems.

The present invention utilizes guard bands between sub-band groups assigned to different subscribers to reduce this type of interference to acceptable levels while maintaining high efficiency in the overall utilization of the bandwidth of the communication link. As noted above, the use of higher genus transformations in the receiver leads to lower sidelobes in the equivalent filters. Hence, the width of the guard bands is much smaller in systems constructed according to the present invention. In practice, a guard band consisting of a single sub-band between two sub-bands or collections of sub-bands is usually sufficient to protect the two sub-bands from interfering with one another because of synchronization errors.

Groups of adjacent sub-bands assigned to a single subscriber need not include guard bands between the commonly assigned sub-bands. In this case, all of the sub-bands are synchronized with one another and the receiver has sufficient information from the training session to correct for errors in synchronization between the subscriber and the central office. In a typical multi-user system, several hundreds of sub-bands are utilized. Any given subscriber receives at least three sub-bands during a communication session. Hence, the loss of a single sub-band between groups of sub-bands does not significantly reduce the amount of information that can be sent on the communication link.

While the above described embodiments of the present invention have utilized shift registers, it will be apparent to those skilled in the art that the shift registers can be replaced by any means for storing gM signal values.

Various modifications to the present invention will become apparent to those skilled in the art from the foregoing description and accompanying drawings. Accordingly, the present invention is to be limited solely by the scope of the following claims.

What is claimed is:

1. An apparatus for decoding a signal generated by a transmitter, said apparatus comprising:

means for receiving a composite signal that varies in time, said composite signal comprising a plurality of channels, each said channel being used to transmit a sequence of symbols;

clock means for defining successive frames, each said frame comprising M time intervals, where M is an integer greater than 1;

means for generating a signal indicative of the amplitude of said composite signal in each of said time intervals;

shift means for storing the last gM said amplitude signals received by said receiving means, where g is an integer greater than 0;

means for generating a first frame symbol signal corresponding to a first one of said channels, said frame symbol signal having an amplitude equal to a first weighted sum of said amplitude signals stored in said shift means, one said frame symbol signal being generated for each said frame;

means for generating a corrected frame symbol signal for said first one of said channels for each said frame, said corrected frame symbol signal comprising a weighted sum of said frame symbol signals generated for said frame in which said frame symbol signal was generated and at least one of said frame symbol signals corresponding to said first one of said channels generated for frames adjacent in time to said frame in which said frame symbol signal was generated.

2. The apparatus of claim 1 further comprising:

means for generating a second frame symbol signal corresponding to said first one of said channels, said second frame symbol signal having an amplitude equal to a second weighted sum of said amplitude signals stored in said shift means, one said second frame symbol signal being generated for each said frame, said second weighted sum being indicative of the signal amplitude in said first channel when said portion of said composite signal in said first channel is shifted by a phase angle greater than zero and different from an integer multiple of 180 degrees, wherein said means for generating a corrected frame symbol signal for each frame further comprises means for generating a second weight sum, said second weighted sum including said second frame symbol signal and at least one of said second frame symbol signals generated for frames adjacent in time to said frame in which said first frame symbol signal was generated.

3. The apparatus of claim 1 further comprising:

means for determining if one of said symbols has been corrupted, for generating an error signal identifying said symbol and for transmitting said error signal to said transmitter.

* * * * *